United States Patent
Nauman et al.

(10) Patent No.: US 6,535,589 B1
(45) Date of Patent: Mar. 18, 2003

(54) METHOD AND APPARATUS FOR REDUCING TRANSMISSION ERRORS IN DIGITAL SUBSCRIBER LINE (DSL) COMMUNICATION SYSTEMS

(75) Inventors: Keith R. Nauman, Treasure Island, FL (US); Ed Thoenes, St. Petersburg, FL (US); Rafael Martinez, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/395,020

(22) Filed: Sep. 13, 1999

(51) Int. Cl.$^7$ .............................................. H04M 11/00
(52) U.S. Cl. ................... 379/93.33; 379/93.08
(58) Field of Search ........................ 379/93.33, 93.31, 379/93.28, 93.08, 93.09, 90.01, 93.01, 372, 373.01; 375/222

(56) References Cited

U.S. PATENT DOCUMENTS

| | | | | |
|---|---|---|---|---|
| 6,061,392 A | * | 5/2000 | Bremer et al. | 375/222 |
| 6,151,335 A | * | 11/2000 | Ko et al. | 370/487 |
| 6,192,109 B1 | * | 2/2001 | Amrany et al. | 375/222 |
| 6,266,348 B1 | * | 7/2001 | Gross et al. | 370/493 |
| 6,269,154 B1 | * | 7/2001 | Chellali et al. | 379/93.09 |
| 6,324,268 B1 | * | 11/2001 | Balachandran et al. | 379/93.08 |

* cited by examiner

*Primary Examiner*—Stella Woo
(74) *Attorney, Agent, or Firm*—Thomas, Kayden, Horstemeyer & Risley, LLP

(57) ABSTRACT

The present invention provides a method and apparatus for reducing the number of bit errors that occur in xDSL data transmissions as a result of baseband ringing. It has been determined that the number of bit errors that occur in xDSL data transmissions as a result of baseband ringing can be reduced by lowering the data transmission rate to a predetermined rate while baseband ringing is occurring. The apparatus of the present invention detects when baseband ringing is occurring over a communication system and causes the data communication equipment (DCE) device located at the central office and the DCE located at the customer premises to begin communicating at a lower, predetermined transmission data rate. When a determination is made by the apparatus that the baseband ringing is no longer present, the apparatus causes the DCE located at the central office and the DCE located at the customer premises to begin communicating at the original data transmission rate. This temporary rate reduction results in an increased operating margin during, and slightly beyond, the time interval in which baseband ringing is occurring.

14 Claims, 3 Drawing Sheets

METHOD AND APPARATUS FOR REDUCING TRANSMISSION ERRORS IN DIGITAL SUBSCRIBER LINE (DSL) COMMUNICATION SYSTEMS

TECHNICAL FIELD OF THE INVENTION

The present invention relates to a method and apparatus for reducing transmission errors in digital subscriber line (DSL) communication systems and, more particularly, to a method and apparatus for reducing or eliminating transmission errors in DSL communication systems caused by baseband ringing by detecting baseband ringing and by reducing the data rate of the DSL communication for the duration of the baseband ringing.

BACKGROUND OF THE INVENTION

In networks that utilize copper pairs, also referred to as metallic loops or twisted wire pairs, baseband telephony services and DSL services are often provided over the same copper pair. In these types of networks, baseband ringing used to signal incoming call requests can result in the occurrence of bit errors in data being transmitted at the higher data rates associated with xDSL technology. POTS (plain old telephone service) filters, or splitters, are widely used to separate the baseband telephony services, which occupy lower frequencies (i.e., typically below 4 kilohertz (KHz)), from the higher data frequencies associated with xDSL services. POTS filters normally filter out signals above 20 KHz so that noise in the baseband does not adversely affect the xDSL transmissions.

However, even where POTS filters are utilized, it has been determined that baseband ringing can produce impulse noise that causes bit errors to occur in the data being transmitted at the higher, DSL data rates. Accordingly, a need exists for a method and apparatus for reducing the number of bit errors that occur in xDSL data transmissions as a result of baseband ringing.

SUMMARY OF THE INVENTION

The present invention provides a method and apparatus for reducing the number of bit errors that occur in xDSL data transmissions as a result of baseband ringing. In accordance with the present invention, it has been determined that the number of bit errors that occur in xDSL data transmissions as a result of baseband ringing can be reduced by lowering the data transmission rate to a predetermined rate while baseband ringing is occurring. This temporary rate reduction results in an increased operating margin during, and slightly beyond, the time interval in which baseband ringing is occurring.

The apparatus of the present invention preferably comprises a filter configured to pass a waveform associated with baseband ringing, an analog-to-digital converter that converts the filtered baseband ringing waveform into a digital signal, and a signal processor that analyzes the waveform to detect baseband ringing. If the signal processor detects the baseband ringing waveform, the signal processor reduces the rate at which DSL data is transmitted over the network. The signal processor also determines when the baseband ringing waveform is no longer present and restores the data transmission rate to the original data transmission rate upon making that determination.

In accordance with the method of the present invention, when a baseband ringing waveform has been detected, the rate of data transmission is reduced to a predetermined rate and a ring timer is set to a preselected time period. When the preselected time period expires, the rate of data transmission is set to the original rate. Preferably, the method of the present invention is performed in software, which is executed by the signal processor. The software preferably comprises two separate routines that are periodically called by the signal processor. One of the routines detects the baseband ringing waveform, sets the ring timer, reduces the data transmission rate to a predetermined rate and returns to the point of execution from which the call to the routine was made. The other routine decrements the ring timer, determines whether the ring timer has been decremented to 0, sets the data transmission rate to the original rate when the ring timer has been decremented to 0, and returns to the point of execution from which the call to the routine was made.

In accordance with the preferred embodiment of the present invention, the apparatus of the present invention is comprised in a data communication equipment (DCE) device (e.g., a DSL modem) located at the central office (CO). The signal processor that performs the method of the present invention preferably is the central processing unit (CPU) of the DCE located at the CO. In addition to the normal tasks performed by the CPU of the DCE, which are well known in the art, the CPU of the DCE executes the two aforementioned routines. In accordance with this embodiment, the DCE located at the CO sends a command to a DCE located at the subscriber premises that informs the subscriber premises DCE of the rate at which data is to be transmitted between the DCE located at the central office and the DCE located at the customer premises. The DCE located at the CO and the DCE located at the customer premises then reduce their respective data rates to the predetermined data rate. When the data transmission rate is to be returned to the original data transmission rate, the DCE of the CO commands the DCE located at the customer premises to transmit data at the original rate, which causes the DCE located at the customer premises to transmit data at the original data transmission rate. The DCE at the CO returns its rate to the original rate and the DCEs at the customer premises and at the CO begin communicating at the original rate.

These and other features and advantages of the present invention will become apparent from the following description, drawings and claims.

DETAILED DESCRIPTION OF THE INVENTION

Figure 1:
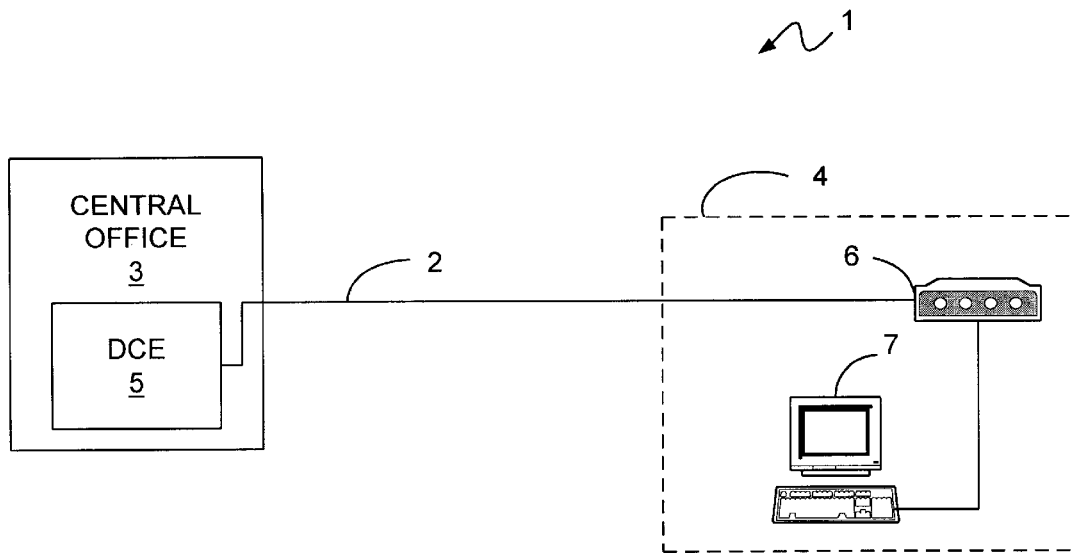
FIG. 1 is an illustration of a network that utilizes a copper pair for communicating baseband telephony services and xDSL data services between a central office and a subscriber, or customer, premises.

FIG. 1 illustrates a communications network 1 utilized for communicating baseband telephony services and XDSL services over a copper pair 2. The network 1 comprises a central office (CO) 3, which is coupled by the copper pair 2 to a customer premises 4. The network 1 may be, for example, part of the public switched telephone network (PSTN). The CO 3 comprises a DCE 5 that is electrically coupled via the copper pair 2 to a DCE 6 located at the customer premises 4. The DCE 6 located at the customer premises 4 is in communication with a data terminal equipment (DTE) device 7, which may be, for example, a personal computer.

For ease of illustration, only one customer premises is shown in FIG. 1. Typically, many customer premises will be electrically coupled to the CO 3 by the copper pair 2. Also, the CO 3 normally comprises many DCEs for communicating with many subscribers. For ease of illustration, only one of the DCEs located at the CO 3 is shown in FIG. 1. Also, it should be noted that the DCE 5 located at the CO 3 typically communicates via copper pair 2 with multiple customer premises DCEs. In order to clearly demonstrate the concepts of the present invention, the present invention will be discussed with reference to communication between a single DCE 5 located at the CO 3 and a single DCE 6 located at the customer premises 4. Those skilled in the art will understand the manner in which multiple instances of the method and apparatus of the present invention may be implemented in a network such as that shown in FIG. 1.

In accordance with the preferred embodiment of the present invention, the apparatus of the present invention is comprised in the DCE 5 located in the CO 3. The apparatus of the present invention must be capable of detecting baseband ringing on the copper pair and of causing the rate of data transmission to be reduced to a predetermined rate upon detecting baseband ringing. This predetermined rate of data transmission must be utilized by both the DCE 5 located at the CO 3 and by the DCE 6 located at the customer premises 4. It is typical in DSL networks for the DCE located at the CO to send a command to the DCE located at the customer premises that causes the DCE located at the customer premises to adjust the rate at which it is transmitting data to the CO. The DCE 5 located at the CO 3 also is normally configured with the ability to detect baseband ringing in order to detect call requests. Therefore, preferably the apparatus of the present invention is incorporated into the DCE 5 located at the CO 3 since the DCE 5 typically is provided with the capability of commanding the customer premises DCE to adjust its rate of data transmission.

However, those skilled in the art will understand that the DCE 6 located at the customer premises 4 is also capable of detecting baseband ringing since it must do so in order to detect incoming call requests. Therefore, the DCE located at the customer premises could be configured to adjust its own rate of data transmission upon detecting baseband ringing. The customer premises DCE 6 could also be configured to send a command to the DCE 5 located at the CO 3 that would cause the DCE 5 located at the CO 3 to adjust its rate of data transmission. Therefore, it will be understood that the present invention is not limited with respect to the location at which the apparatus of the present invention is physically implemented.

Figure 2:
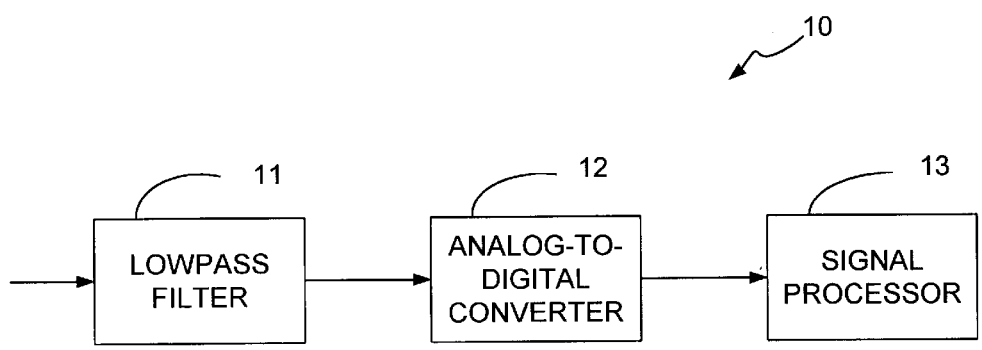
FIG. 2 is a functional block diagram of the apparatus of the present invention in accordance with the preferred embodiment.

FIG. 2 is a functional block diagram of the apparatus 10 of the present invention in accordance with the preferred embodiment. The apparatus 10 of the present invention preferably comprises a low-pass filter 11, which separates telephony baseband signals from DSL signals and passes the telephony baseband signals to an analog-to-digital converter (ADC) 12. The baseband telephony signals normally have a frequency that is below 4 kilohertz. The baseband ringing waveform is an analog waveform that is within this frequency range, but is at a much higher voltage level than the voltage levels of other baseband telephony signals being transmitted over the network, including the on-hook and off-hook voltage levels.

Typically, the baseband ringing waveform has a voltage level that is approximately 200 volts peak-to-peak. The ADC 12 receives this waveform and converts it into a digital signal, which is then delivered to the signal processor 13. As stated above, the signal processor preferably is the CPU of the DCE 5 located at the CO 3. However, a separate processor may be utilized for performing the method of the present invention, as will be understood by those skilled in the art. The signal processor 13 compares the digital signal received from the ADC 12 to a predetermined threshold value, such as 60 volts, for example, to determine whether or not the digital waveform corresponds to the baseband ringing waveform.

It should be noted that there are a variety of known ways to detect baseband ringing. The present invention is not limited with respect to the manner in which this is accomplished. Preferably, baseband ringing is detected in the manner discussed above by utilizing the low-pass filter 11, the ADC 12 and the signal processor 13 in the aforementioned manner. However, those skilled in the art will understand that this may be accomplished by utilizing other techniques and devices.

Figure 3:
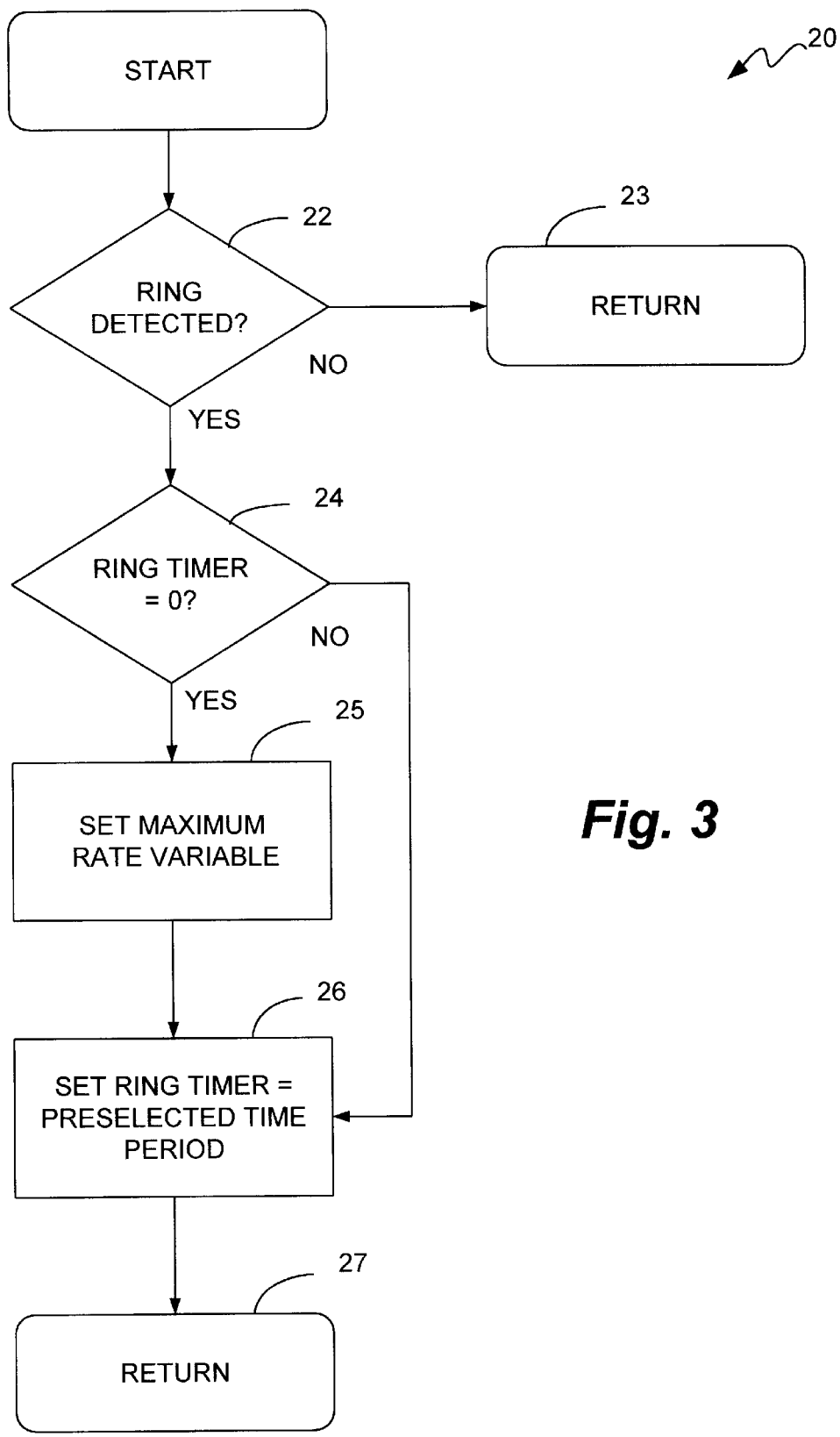
FIG. 3 is a flow chart of a first routine executed by the apparatus of the present invention shown in FIG. 2 to reduce the data transmission rate to a lower rate.

FIG. 3 is a flow chart of a first routine 20 performed by the signal processor 13. This routine determines whether a baseband ring has been detected and, if so, performs the functions of setting a ring timer and of setting the maximum rate at which data transmission can occur. The routine shown in FIG. 3 causes the maximum rate at which data can be transmitted to be set to a rate that is lower than the original data transmission rate (i.e., the rate at which data is being transmitted before lowering the rate). It should be noted, however, that it is not necessary that the current data rate be reduced in all cases. For example, data may be currently being transmitted at a data rate which is less than or equal to the predetermined rate. In this case, there is no need to reduce the data rate.

With reference to FIG. 3, when the routine 20 is being executed by the signal processor 13, a first determination is made as to whether or not a baseband ring has been detected, as indicated by block 22. If a ring is not detected, the signal processor returns to the point of execution that the signal processor was at before the routine 20 was called. Preferably, the routine shown in FIG. 3 is called periodically. In DSL networks, data rates typically are not adjusted during the transmission of a frame of data. Preferably the routine 20 is called at a rate which is equal to or greater than the rate at which frames are currently being transmitted. The kernel of the signal processor 13 preferably is configured to periodically interrupt the signal processor 13 and cause the signal processor 13 to call the routine 20.

If a ring is detected at block 22, then a determination is made at block 24 as to whether or not a ring timer has previously been set. A cadence, or silence, period occurs between ring signals. The ring timer is set to a predetermined time period that is sufficiently long to ensure that the baseband ringing is no longer occurring. As discussed below in more detail with reference to FIG. 4, setting the ring timer ensures that the data transmission rate is not restored to the original data transmission rate before a sufficient number of rings have been allowed to occur. For example, the ring timer may be set to five seconds in order to c over a sufficient number of rings and cadence intervals.

A determination made at block 24 that the value of the ring timer is 0 indicates either that a ring has not previously been detected or that a ring was previously detected, but that the ring timer has already been decremented to 0 (i.e., the baseband ringing ended and the data rate was restored to the original data rate). In either case, the process proceeds to block 25 where a maximum data rate variable is set. At some point after the signal processor 13 returns to the point of execution from which the routine was called, the signal processor 13 will check the maximum data rate variable. If it has been set, the signal processor 13 will cause the transmission rate of the DCE 5 and of the DCE 6 to be reduced to the preselected, lower rate.

After setting the maximum rate variable, the process proceeds to block 26 where the ring timer is set equal to a preselected time period (e.g., five seconds). The routine then returns to the point of execution from which it was called, as indicated by block 27.

A determination made at block 24 that the ring timer is not equal to zero indicates that a ring was previously detected, that the rate of transmission is already set to the preselected rate and that the ring timer has not yet expired. Therefore, the process proceeds from block 24 to block 26 where the ring timer is set to the preselected ring timer period. The process then proceeds to block 27 and control is returned to the point of execution from which the routine 20 was called.

When the signal processor 13 returns from block 27 to the point of execution from which the routine 20 was called, data is being, or is soon to be, transmitted at the preselected, lower rate, depending on whether or not the maximum rate variable has previously been set in response to detecting a previous ring. It should be noted that at this point, the DCE 5 of the CO 3 either has already sent, or will soon send, the command to the customer premises DCE 6 to cause it to transmit at the lower, preselected rate. Data will continue to be transmitted at the lower rate until the ring timer expires, as discussed below with reference to FIG. 4. Therefore, a mechanism is needed to decrement the ring timer so that the data transmission rate can be returned to the original data transmission rate once the baseband ringing is no longer occurring.

Figure 4:
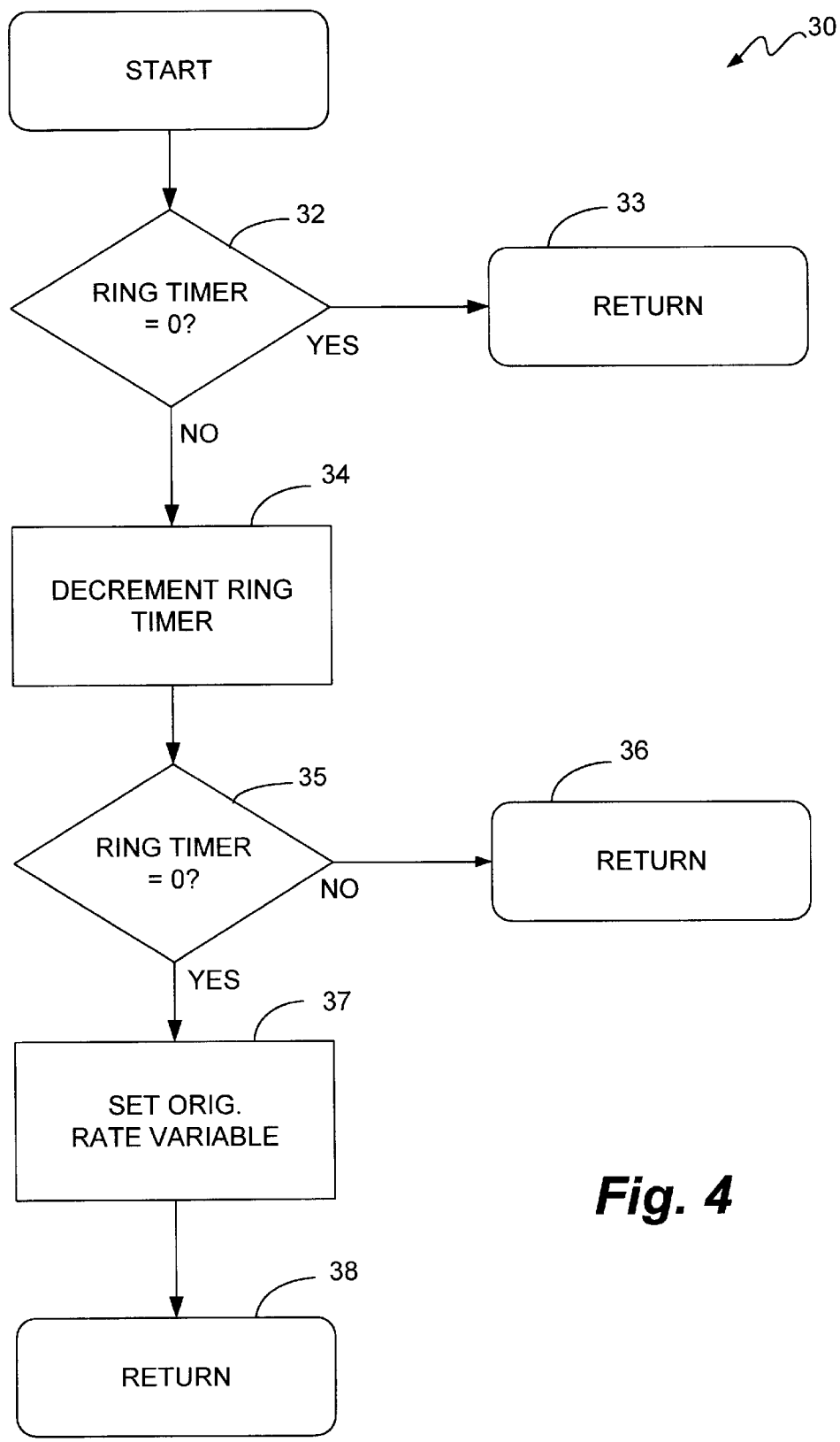
FIG. 4 is a flow chart of a second routine executed by the apparatus of the present invention shown in FIG. 2 to restore the data transmission rate to the original data transmission rate.

FIG. 4 is a flow chart illustrating a second routine 30 performed by the signal processor 13. This routine 30 is responsible for decrementing the ring timer and for causing the data transmission rate to be restored to the original data transmission rate. In accordance with the preferred embodiment, a separate routine is utilized for this purpose. However, those skilled in the art will understand that the routines shown in FIGS. 3 and 4 may be integrated into a single routine, if desired. However, by separating the routines in this manner, the routines can be called independently.

It is advantageous to separate the routines because doing so ensures that the rate will not be restored to the original rate during a cadence interval. It would be undesirable to switch to the lower data rate when a ring is detected and back to the original data rate during an associated cadence interval, because doing so would cause bit errors to occur. Separation of routines 20 and 30 ensures that this will not occur.

When the routine 30 is called, a determination is made at block 32 as to whether or not the ring timer is equal to zero. If so, the process returns to the point from which the routine 30 was called, as indicated by block 33. If the ring timer is equal to 0, this indicates that a ring has not previously been detected, or if it has, that the transmission rate has already been restored to the original transmission rate. If the ring timer is not equal to zero, the process proceeds to block 34 and the ring timer is decremented by a particular value. A determination is then made at block 35 as to whether or not the ring timer is equal to zero. If not, the routine returns to the point of execution from which it was called, as indicated by block 36.

If the ring timer is equal to zero, this indicates that the baseband ringing is no longer occurring. Therefore, the process proceeds to block 37 where the original data rate variable is set. The signal processor 13 then returns to the point of execution from which the routine was called, as indicated by block 38. After the signal processor returns from the routine 30, the signal processor 13 will check the original data rate variable. If the original data rate variable is set, the signal processor 13 will inform the customer premises DCE 6 that it is to transmit data at the original data rate. The DCE 5 and the DCE 6 will then begin communicating at the original data rate.

It should be noted that the present invention has been described with reference to the preferred embodiments, but that the present invention is not limited to these embodiments. Those skilled in the art will understand that modifications can be made to the embodiments discussed above that are within the scope of the present invention. For example, modifications may be made to the routines 20 and 30 that are within the scope of the present invention, as will be understood by those skilled in the art. All such modifications should be construed as being within the scope of the present invention, as defined by the claims.

What is claimed is:

1. An apparatus for reducing transmission errors in a communications system, the apparatus transmitting data over the communications system at different rates, the apparatus comprising:

a baseband ring detector, the baseband ring detector configured to detect baseband ringing in the communications system, wherein when the baseband ring detector detects the presence of baseband ringing in the communications system, the baseband ring detector causes the rate at which the apparatus is transmitting data over the communications system to be reduced to a first transmission rate, wherein the baseband ring detector is also configured to detect an absence of baseband ringing in the communications system, wherein when the apparatus is transmitting data over the communication system at the first transmission rate and the baseband ring detector detects an absence of baseband ringing on the communications system, the baseband ring detector causes the apparatus to transmit data over the communication system at a second transmission rate.

2. The apparatus of claim 1, wherein the apparatus is comprised in a data communications equipment (DCE) device located at a central office of the communications system, the DCE located at the central office being coupled via a copper pair to a second data communications equipment (DCE) device located at a customer premises, and wherein when the baseband ring detector detects baseband ringing, the DCE located at the central office sends rate information over the copper pair to the DCE located at the customer premises to inform the DCE located at the customer premises that the DCE located at the central office and the DCE located at the customer premises are to transmit data at the first transmission rate.

3. The apparatus of claim 2, wherein after the rate information is received by the DCE located at the customer premises, the DCE located at the customer premises and the DCE located at the central office begin communicating data over the copper pair at the first transmission rate.

4. The apparatus of claim 3, wherein if the baseband ring detector detects an absence of baseband ringing over the communications system after the DCE located at the central office and the DCE located at the customer premises have begun communicating at the first transmission rate, the DCE located at the central office sends rate information to the DCE located at the customer premises that informs the DCE located at the customer premises that the DCE located at the central office and the DCE located at the customer premises are to begin communicating data at the second transmission rate.

5. The apparatus of claim 4, wherein after the DCE located at the customer premises receives the rate information indicating that the DCE located at the central office and the DCE located at the customer premises are to communicate data at the first transmission rate, the DCE located at the central office and the DCE located at the customer premises begin communicating information over the copper pair at the second transmission rate.

6. The apparatus of claim 5, wherein the baseband ring detector comprises:
a low-pass filter coupled to the copper pair, the low-pass filter passing information received thereby that is transmitted at a rate equal to or less than 20 kilohertz;
an analog-to-digital converter coupled to the low-pass filter, the analog-to-digital converter receiving the information passed by the low-pass filter, the analog-to-digital converter converting the information received thereby into digital information; and
a signal processor coupled to the analog-to-digital converter, the signal processor receiving the digital information from the analog-to-digital converter, the signal processor comparing the digital information to a predetermined threshold value to determine whether or not the digital information is associated with baseband ringing, wherein if the signal processor determines that the digital information is associated with baseband ringing, the signal processor causes the apparatus to lower the rate at which it is transmitting data over the communication system to the lower transmission rate.

7. The apparatus of claim 6, wherein the signal processor is the central processing unit (CPU) of the DCE located at the central office.

8. A method for reducing transmission errors in a communications system, the communications system comprising a central office including a data communications equipment (DCE) device, a copper pair coupled to the central office, and a data communications equipment (DCE) device located at a customer premises, the DCE located at the customer premises being coupled to the copper pair, the DCE located at the central office and the DCE located at the customer premises communicating with each other over the copper pair, the method comprising:
detecting baseband ringing on the copper pair;
upon detecting baseband ringing on the copper pair, adjusting the transmission rate of the DCE located at the central office and of the DCE located at the customer premises to a first transmission rate;
detecting an absence of baseband ringing on the copper pair; and
upon detecting an absence of baseband ringing on the copper pair, causing data to be transmitted between the DCE located at the central office and the DCE located at the customer premises at a second transmission rate.

9. The method of claim 8, further comprising the step of:
after the step of detecting baseband ringing, sending data rate information from the DCE located at the central office to the DCE located at the customer premises, the data rate information informing the DCE located at the customer premises that the DCE located at the customer premises is to communicate with the DCE located at the central office at the first transmission rate.

10. The method of claim 8, wherein the step of detecting baseband ringing comprises the step of:
determining whether a value of a ring timer is equal to zero, wherein if a determination is made that the ring timer is not equal to zero, setting the ring timer to a preselected time period, wherein if a determination is made that the ring timer is equal to zero, setting a maximum rate variable.

11. The method of claim 10, further comprising the step of:
after the maximum rate variable has been set and before the step of transmitting the data at the first transmission rate, making a determination as to whether or not the maximum rate variable has been set, wherein if a determination is made that the maximum rate variable has been set, the DCE located at the central office and the DCE located at the customer premises begin communicating at the first transmission rate.

12. The method of claim 11, further comprising the steps of:
after the step of transmitting data at the first transmission rate, decrementing the ring timer;
determining whether or not the ring timer has been decremented to zero; and wherein if a determination is made that the ring timer has been decremented to zero, setting a second data rate variable.

13. The method of claim 12, further comprising the steps of:

determining whether or not the second data rate variable has been set; and if a determination is made that the second data rate variable has been set, causing data to be transmitted between the DCE located at the central office and the DCE located at the customer premises at the second data rate.

14. A computer program for reducing transmission errors in a communications system, the communications system comprising a central office that includes a data communications equipment (DCE) device and a customer premises including a data communications equipment (DCE) device, the DCE located at the central office and the DCE located at the customer premises being electrically coupled together via a copper pair, the computer program being embodied on a computer-readable medium, the computer program comprising:

a first routine, the first routine detecting when baseband ringing is occurring in the communications system, wherein when the first routine detects the presence of baseband ringing in the communication system, the first routine outputs an indication that the rate at which data is being transmitted between the DCE located at the central office and the DCE located at the customer premises is to be lowered to a first transmission rate; and a second routine for determining when baseband ringing is no longer occurring over the communications system, wherein when the second routine detects an absence of baseband ringing in the communication system, the second routine outputs an indication that the rate at which data is being transmitted between the DCE located at the central office and the DCE located at the customer premises is to be changed to a second transmission rate.

* * * * *